May 28, 1963   D. R. BISHOP ET AL   3,091,379
PHOTOGRAPHIC APPARATUS
Filed Aug. 15, 1960   2 Sheets-Sheet 1

INVENTORS
Donald R. Bishop
and
BY Louis E. Bruneau
Brown and Mikulka
and
Wilfred J. Caranick
ATTORNEYS

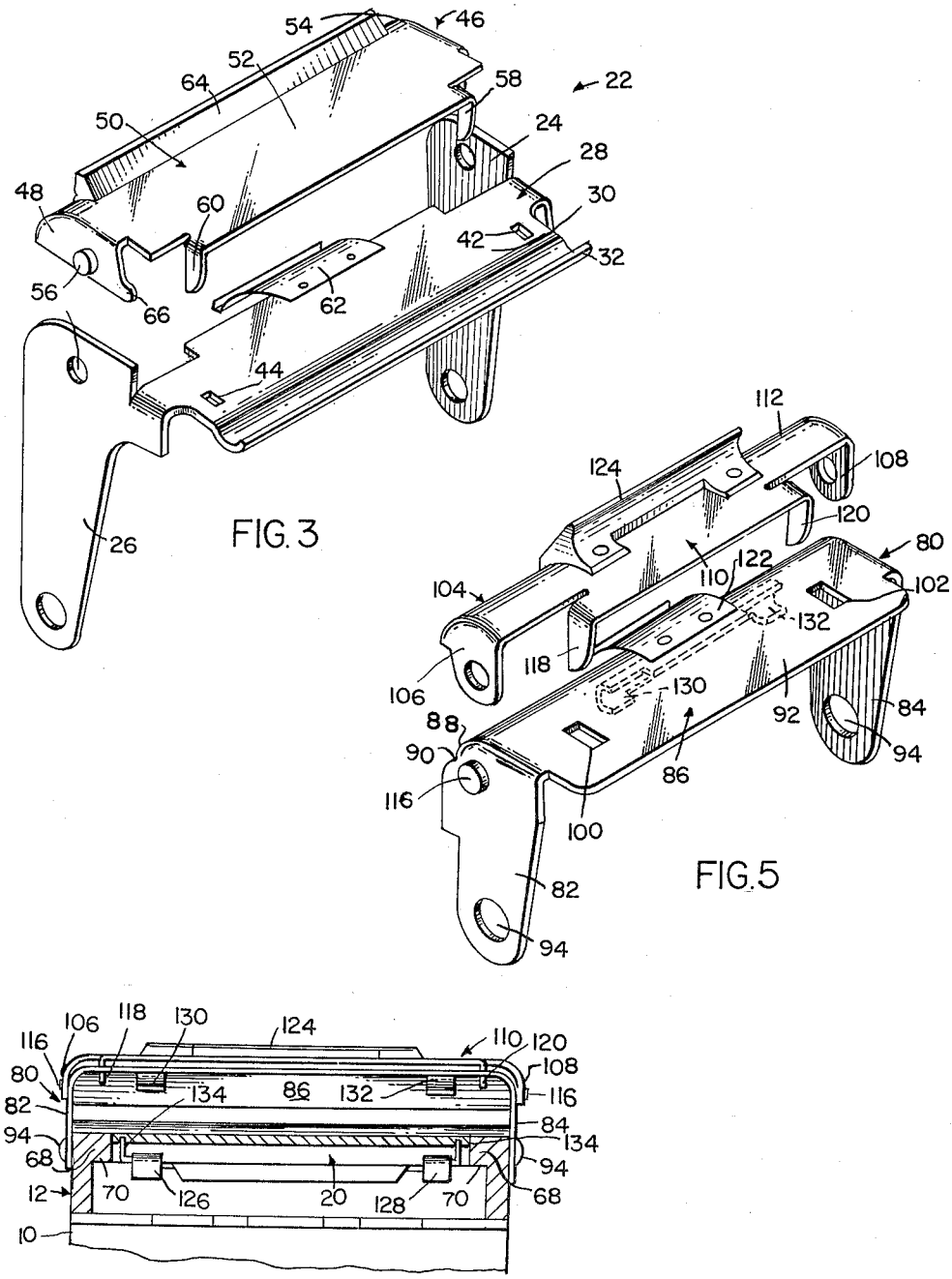

United States Patent Office 3,091,379
Patented May 28, 1963

3,091,379
PHOTOGRAPHIC APPARATUS
Donald R. Bishop, Westwood, and Louis O. Bruneau, Weston, Mass., assignors to Polaroid Corporation, Cambridge, Mass., a corporation of Delaware
Filed Aug. 15, 1960, Ser. No. 49,636
9 Claims. (Cl. 225—89)

This invention relates to photography, and more particularly to novel locking means for devices for severing photographic sheet materials which extend from a chamber, for example an imbibition chamber, in a camera.

Hitherto, cutting devices of the type hereinafter described, for severing photographic sheet materials extending through an aperture leading into an imbibition chamber in a camera of the type sold as Polaroid Land cameras, have been locked into an operative position by such methods as simple friction locking devices as described in U.S. Patent No. 2,510,306, issued June 6, 1950, to A. J. Bachelder, or by the positive locking action of a pin and deformable arm mechanism as described in U.S. Patent No. 2,740,342, issued April 3, 1956, to Herbert A. Bing et al., or by the positive locking action of a pin and lever or arm mechanism having a cam slot as described in U.S. Patent No. 2,869,444, issued January 20, 1959, to Richard R. Wareham. While these methods have been satisfactory, the present invention comprehends an improved locking means having both simplicity and positive locking action.

Accordingly, it is an object of this invention to provide a novel, simple means for positively locking a device for severing photographic sheet materials which extend from a camera.

Another object of this invention is to provide novel means for releasing a rigidly locked device for severing photographic sheet materials which extend from a camera.

Other objects of this invention will in part be obvious and will in part appear hereinafter.

This invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is an exploded perspective view showing parts of the cutting device herein disclosed;

FIG. 5 is an exploded perspective view showing parts of the cutting device of FIG. 4; and FIG. 6 is a fragmentary perspective view showing the camera and mechanism of FIG. 4 in an open or inoperative position.

The invention is adapted for incorporation into the structure of a self-developing camera of the type shown in U.S. Patent No. 2,740,340, issued April 3, 1956, to Herbert A. Bing and James E. Hunter, Jr., for photographic apparatus having an imbibition chamber wherein photographic sheet materials are processed and from which continuous predetermined portions of said materials are manually withdrawn through an aperture or passage in the housing in the camera and severed from said materials remaining therein. As a means for severing said portions of said materials, a cutter bar is mounted on the camera housing adjacent the passage leading into an imbibition chamber, for movement relative to said housing between an open or inoperative position and a closed or operative position. A cutter bar latching means associates or cooperates with the cutter bar. In one embodiment the latching means is pivotally mounted on the cutter bar. The cutter bar alone, or in combination with the latching means therefor, comprises means for occluding light from the imbibition chamber by covering said passage. The invention is so mounted on the camera that pivoting the cutter bar into an operative or closed position results in the cutter bar latching means engaging a rigid, positive locking means whereby the cutter bar is retained in said position, thus relieving the operator from any necessity of manually holding the cutter bar in position while the sheet materials are forced across the bar for cutting. The cutter bar latching means preferably also provides for instantaneous disengagement from the locking means whereby the release of the cutter bar latching means by the operator simultaneously results in the cutter bar being freed for movement and pivoting to an inoperative or open position, allowing withdrawal of the next successive portion of the photographic sheet materials.

Figure 1:
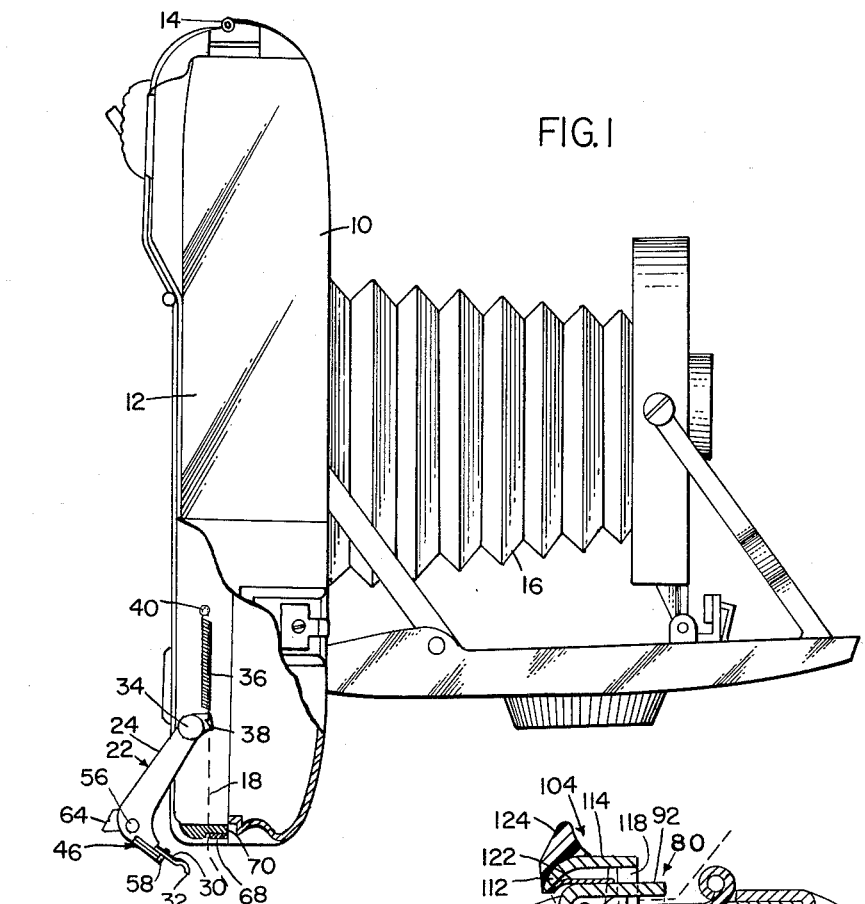
FIGURE 1 is a view, partly in section, of a handheld camera embodying the herein disclosed invention wherein the device is shown in an open or inoperative position.
Figure 2:
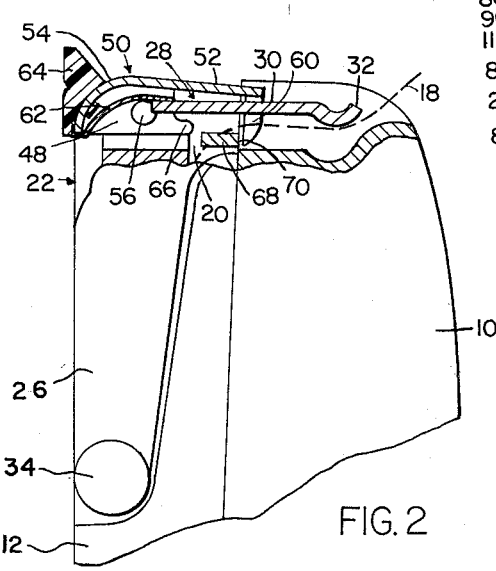
FIG. 2 is a fragmentary sectional view showing the camera and mechanism of FIG. 1 in a closed or operative position.

Referring now to FIGS. 1 through 3, wherein like numbers represent like elements, the camera comprises casing or housing portions 10 and 12 mounted for pivotal movement with respect to one another by hinge 14. Also shown is bellows 16, it being understood that the remaining operative elements of the camera may be similar to those of the camera described in the above-mentioned Patent No. 2,740,340. Photographic sheet materials 18 represented by dotted lines are withdrawable through passage 20 provided at one end of housing portion 12 when said portion is in a closed position as shown.

In the embodiment of the invention shown in FIGS. 1, 2 and 3, a pivotal sheet-severing or cutter bar means comprising a yoke-like element 22 including a pair of arms 24 and 26 integrally secured or appended to opposite ends of a transverse member or crossbar 28 having a relatively flat portion 30 and a relatively straight-edge transverse or longitudinal portion 32, is pivotally attached on housing portion 12 of the camera by pivot or hinge means 34 engaging arms 24 and 26. Arms 24 and 26 are coaxially mounted on said housing portion 12 adjacent passage 20 for movement between a closed position, as shown in FIG. 2, wherein said element overlaps end portions of housing 10 and 12 and covers said passage and an open position, as shown in FIG. 1, wherein said element is to one side of said passage and said housing end portions. A resilient means, such as spiral spring 36, is anchored at one end to one of said arms, such as arm 24, by means comprising opening 38 in arm 24 into which opening one end of spring 36 is fitted, spring 36 being anchored at its other end to housing portion 12 as at pin or projection 40. Resilient means 36, in conjunction with pivot means 34, comprise a means for imparting a bias to yoke-like element 22 for urging said element into the closed position. A pair of apertures 42 and 44 are located within transverse member 28, preferably within flat portion 30 thereof, said apertures being in a predetermined space relation. The apertures are positioned or laterally spaced within transverse member 28 so as to be beyond the transverse edges of photographic sheet materials 18 extending through slot or passage 20. Transverse member 28 coupled with arms 24 and 26 comprise a cutter bar.

Mounted for pivotal movement on yoke-like element 22 is a cutter bar latching means comprising a second yoke-like element 46 including arm 48, a corresponding arm (not shown) and a transverse connecting member or bar 50 having both a relatively flat portion 52 and a convex or arcuate portion 54. The pair of arms which are joined or secured to opposite ends of transverse bar 50 are coaxially mounted on arms 24 and 26 of yoke-like element 22 by pivot means 56. Transverse bar 50 is substantially coextensive in length with transverse member 28. At least a lower portion of transverse bar 50 overlaps or covers at least an upper portion of transverse member 28, the two overlapping portions being in substantially the same plane. A pair of finger-like elements or projections 58 and 60 are provided on transverse bar 50, preferably at the lower portion thereof, said fingers extending or projecting toward transverse member 28 and the camera housing. The finger-like projections are predeterminedly spaced or located so as to engage and extend through apertures 42 and 44 carried by transverse member 28. A resilient means, such as a thin, metallic strip or leaf spring 62 is joined at its ends to upper portions of transverse member 28 and transverse bar 50. Resilient means 62, in conjunction with pivot means 56, comprise a means for imparting a bias to yoke element 46 for urging said element toward transverse member 28 and finger-like projections 58 and 60 through apertures 42 and 44 respectively. For facility in pivoting element 46 away from transverse member 28, there is secured on transverse bar 50 means such as a tab or grip 64 upon which pressure may be exerted. As shown, gripping means 64 extends almost completely across the arcuate cross-section 54 of transverse bar 50. In order to limit the pivotal movement of element 46 so as to prevent destruction of spring means 62, there may be provided on one or more of the arms of element 46 a finger-like element or projection 66 which, as shown, assumes a position behind transverse member 28. Projection 66 contacts the inner surface of transverse member 28 when element 46 has passed through an arc of predetermined curvature. Thus, the maximum outward pivotal position attainable by element 46 results when projection 66 contacts the inner surface of transverse member 28. Projection 66, in combination with member 28, form a mechanical stop means for limiting the outward pivotal movement of element 46 which comprises the cutter bar latching means. Element 22, coupled with element 46, provide a closure for occluding light from passage 20.

As a means for locking the above-described mechanism, there is carried by the end wall of housing portion 12 a pair of rigid shoulder-shaped engagement means 68, only one being shown, the engagement means being predeterminedly spaced so as to be located in the path of movement of finger-like projections 58 and 60, said projections thus being adjacent surface or face portions 70 of said engagement means when elements 22 and 46 are in a closed position. The tendency of element 22 to pivot is arrested by the positive latching or locking action formed by the engagement of finger-like projections 58 and 60 with surface portions 70. It should be noted that the finger-like projections 58 and 60 and the shoulder-shaped engagement means 68 therefor are laterally spaced so as to be positioned beyond the transverse edges of the photographic sheet materials 18 and thus are substantially out of contact with the sheet materials extending through passage 20 so that said materials do not interfere with operation of finger-like projections 58 and 60 relative to shoulder-shaped engagement means 68.

When elements 22 and 46 are in a closed or operative position, photographic sheet materials 18 extend through passage 20. A short portion of sheet materials 18 extending from the camera provides a tab or leader which may be grasped to withdraw portions of said materials. When elements 22 and 46 are in a closed position and are positively held in said position by the aforementioned locking means, a portion of sheet materials 18 may be severed by manually drawing or tearing the same against a suitably formed or sharpened edge of straight-edge portion 32 of transverse member 28.

After the said materials are severed, the yoke-like element 22 comprising a cutter bar may be unlocked and pivoted to an open position by applying pressure on tab 64 attached to transverse bar 50 which results in pivoting bar 50 outwardly from transverse member 28 so as to cause withdrawal of finger-like projections 58 and 60 from shoulder-shaped engagement means 68. In the open or inoperative position the leader portion of said sheet materials may be grasped and another portion of said sheet materials withdrawn, whereupon elements 22 and 46 return to a closed position under the bias of spring 36 and the severing operation is repeated.

Figure 4:
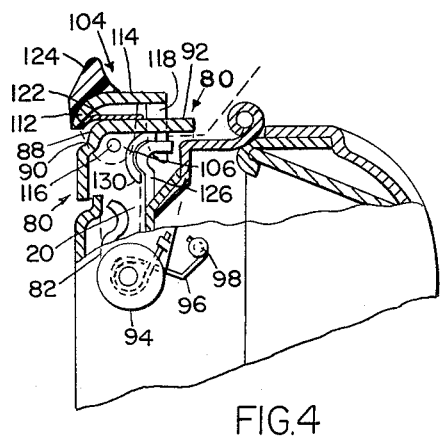
FIG. 4 is a fragmentary sectional view showing another form of the invention.

In FIGS. 4, 5 and 6, wherein like members represent like or similar elements, there is illustrated a somewhat different embodiment of the invention. In the embodiment shown, a pivotal sheet-severing means comprises a yoke-like element 80 including a pair of arms 82 and 84 secured to opposite ends of a transverse connecting member 86 having a relatively arcuate portion 88 with a groove or recess 90, and a relatively flat straight-edged portion 92. Arms 82 and 84 are coaxially mounted on housing portion 12 adjacent passage 20 for movement relative to said housing between an open and a closed position. Element 80, comprising a cutter bar and providing a closure for occluding light from passage 20, is pivotally attached on housing portion 12 of the camera by pivot or hinge means 94. A resilient means, such as torsion spring 96, is anchored at one end to one of said arms (such as arm 82) as shown and at its other end to housing portion 12 as at projection 98. Torsion spring means 96 in conjunction with pivot means 94 function in the same manner as spiral spring means 36 and pivot means 34. A pair of apertures 100 and 102 are located within transverse member 86, said apertures being in a predetermined space relation as heretofore described.

A cutter bar latching means comprises a second yoke-like element 104 mounted for pivotal movement on yoke element 80, said element 104 including a pair of arms 106 and 108 appended or joined to the ends of a transverse member of bar 110 having a convex or arcuate portion 112 and a relatively flat, straight-edged portion 114. Pivot means 116 engaging arms 82 and 106, and 84 and 108, respectively, are provided for mounting the second yoke-like element 104 upon the first yoke-like element 80, so that said two elements are substantially coextensive. A pair of finger-like projections 118 and 120 are provided on transverse bar 110, said finger-like projections being disposed as described heretofore. A resilient means such as a flat, thin metallic strip or leaf spring 122 joins transverse member 86 with the upper portion of transverse bar 110. Resilient means 122, in conjunction with pivot means 116, function in the same manner as spring means 62 and pivot means 56. For facility in pivoting element 104 away from element 80 there is provided a means such as a tab or handle 124 attached to transverse bar 110. The gripping means 124 is preferably elongated so as to extend across a substantial portion of the arcuate cross-section 112 of transverse bar 110. It should be noted that in this embodiment the outward pivotal movement of element 104 is restricted or limited by the contact of the upper edge thereof with groove or recess portion 90 which presents a mechanical stop. Element 104 comprises cutter bar latching means. The means for locking the above-described mechanism is as previously set forth.

With the yoke-like elements 80 and 104 in a closed or operative position, photographic sheet materials extend through passage 20 and are supported by a pair of laterally spaced hook-like guide members 126 and 128 secured to the end wall of portion 12 adjacent said passage. Each of the guide members extends or projects towards the inner surface of transverse connecting bar 110. The curved unsupported end of said guide members requires the sheet materials to curve sharply therearound. Hook-like sheet-engaging members 130 and 132 are attached to the inner surface of transverse member 86 such that when element 80 is in a closed position the sheet-engaging members 130 and 132 are in a superposed relation with hook-like guide members 126 and 128 respectively. The sheet-engaging members cooperate or mate with the guide members for conforming therearound a portion of the sheet materials and for firmly grasping said portion of sheet materials therebetween. The bending of the sheet materials around and over the hook-like guide members 126 and 128 and the securing or locking of said materials between grasping or holding means comprising guide members 126 and 128 and sheet-engaging members 130 and 132 respectively serves to prevent any lineal or lateral movement of the sheet materials during severing operations. Guide flanges 134 and 136 positioned just beyond the transverse edges of the sheet materials may also be employed to oppose or prevent lateral movement of said materials. Instead of the structures shown for members 126, 128, 130 and 132, other suitable structures may be employed. For example, these members may comprise angular strips.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic apparatus wherein photographic sheet materials are processed, said apparatus having a passage formed therein from which portions of said sheet materials may be drawn, the combination with said apparatus of pivotal means comprising a transverse member including a longitudinal edge for severing portions of said sheet materials and at least one predeterminedly disposed aperture, said pivotal means being mounted on said apparatus adjacent said passage for movement between a closed position wherein said member covers said passage and an open position wherein said member is to one side of said passage, second pivotal means mounted for movement on said first pivotal means, said second pivotal means comprising a transverse bar including at least one finger-like projection predeterminedly disposed for engaging and extending through said aperture, at least one engagement means comprising a shoulder-shaped surface carried by said apparatus, said engagement means being in the path of movement of said finger-like projection, said pivotal means being locked in said closed position when said finger-like projection is in engagement with said shoulder-shaped surface whereby a portion of said sheet materials may be drawn against and severed by said longitudinal edge, said finger-like projections being releasable from said shoulder-shaped surface by pivotal movement of said second pivotal means.

2. The photographic apparatus of claim 1 wherein resilient first means are provided for urging said first pivotal means into said closed position and second resilient means are provided for urging said finger-like projection through said aperture.

3. In a photographic apparatus wherein photographic sheet materials are processed, said apparatus having a passage formed therein from which portions of said sheet materials may be drawn, the combination with said apparatus of pivotal means comprising a transverse member including a longitudinal edge for severing portions of said sheet materials and a pair of predeterminedly spaced apertures, said pivotal means being mounted on said apparatus adjacent said passage for movement between a closed position wherein said member covers said passage and an open position wherein said member is to one side of said passage, second pivotal means mounted for movement on said first pivotal means, said second pivotal means comprising a transverse bar including a pair of finger-like projections predeterminedly spaced for engaging and extending through said apertures, a pair of engagement members in the path of movement of said finger-like projections carried by said apparatus, said engagement members each comprising a shoulder-shaped surface, said apertures, said finger-like projections and said engagement members being disposed beyond the transverse edges of said sheet materials, said pivotal means being locked in said closed position when said finger-like projections extending through said apertures are in engagement with said shoulder-shaped surfaces whereby a portion of said sheet materials may be drawn against and severed by said longitudinal edge, said finger-like projections being releasable from said shoulder-shaped surfaces by pivotal movement of said second pivotal means.

4. In a photographic apparatus wherein photographic sheet materials are processed, said apparatus having a passage formed therein from which portions of said sheet materials may be drawn, the combination with said apparatus of a sheet-severing means comprising a yoke-like element including a transverse having a longitudinal edge for severing portions of said sheet materials and a pair of laterally spaced aperatures, and a pair of arms secured to the ends of said transverse member, said arms being pivotally mounted on said apparatus adjacent said passage for pivotal movement between a closed position wherein said element covers said passage, and an open position wherein said element is to one side of said passage, latching means comprising a second yoke-like element including a transverse bar having a pair of finger-like projections laterally spaced as said apertures and a pair of arms secured to the ends of said transverse bar, said finger-like projections engaging and extending through said apertures, said arms of said second yoke-like element being pivotally mounted on said first yoke-like element, a pair of engagement members in the path of movement of said finger-like projections carried by said apparatus, said engagement members each comprising a shoulder-shaped surface, said apertures, said finger-like projections and said engagement members being disposed beyond the transverse edges of said sheet materials, said yoke-like elements being locked in said closed position when said finger-like projections extending through said apertures are in engagement with said shoulder-shaped surfaces whereby a portion of said sheet materials may be drawn against and severed by said longitudinal edge, said finger-like projections being releasable from said shoulder-shaped surfaces by pivotal movement of said second yoke-like element.

5. In a photographic apparatus wherein photographic sheet materials are processed, said apparatus having a passage formed therein from which portions of said sheet materials may be drawn, the combination with said apparatus of a sheet-severing means comprising a yoke-like element including a transverse member having a longitudinal edge for severing portions of said sheet materials and a pair of predeterminedly spaced apertures, and a pair of arms secured to the ends of said transverse member, said arms being pivotally mounted on said apparatus adjacent said passage for pivotal movement between a closed position wherein said element covers said passage and an open position wherein said element is to one side of said passage, resilient means secured at a portion of said apparatus and at a portion of at least one of said arms for urging said element into said closed position, latching means comprising a second yoke-like element including a transverse bar having a pair of finger-like projections predeterminedly spaced as said apertures, and a pair of arms secured to the ends of said transverse bar, said finger-like projections engaging and extending through said apertures, said arms of said second yoke-like element being pivotally mounted on said first yoke-like element, resilient means secured at its ends to portions of said yoke-like elements for urging said finger-like projections through said apertures, a pair of engagement members in the path of movement of said finger-like projections carried by said apparatus, said engagement means each comprising a shoulder-shaped surface, said apertures, said finger-like projections and said engagement members being disposed beyond the transverse edges of said sheet materials, said yoke-like elements being locked in said closed position when said finger-like projections extending through said apertures are in engagement with said shoulder-shaped surfaces whereby a portion of said sheet materials may be drawn against and severed by said longitudinal edge, said finger-like projections being releasable from said shoulder-shaped surfaces by pivotal movement of said second yoke-like element.

6. The photographic apparatus of claim 5 wherein there is provided a pair of laterally spaced guide members secured to a wall of said apparatus within said passage, each of said guide members including an unsupported end section extending toward the inner surface of said transverse member and a pair of sheet-engaging members laterally spaced as said guide members secured to the inner surface of said transverse member and extending toward said passage, said sheet-engaging members and said guide members being in a superposed relation and holding said sheet materials therebetween when said yoke-like elements are in said closed position.

7. The photographic apparatus of claim 5 wherein said second yoke-like element also includes an elongated gripping means upon which pressure may be exerted so as to cause pivoting of said second yoke-like element outwardly from said first yoke-like element.

8. In a photographic apparatus wherein photographic sheet materials are processed, said apparatus having a passage formed therein from which portions of said sheet materials may be drawn, the combination with said apparatus of pivotal means comprising a transverse member including a longitudinal edge for severing portions of said sheet materials, said pivotal means being mounted on said apparatus adjacent said passage for movement between a closed position wherein said member covers said passage and an open position wherein said member is to one side of said passage, second pivotal means mounted for movement on said first pivotal means, said second pivotal means including at least one finger-like projection extending toward said apparatus, at least one engagement means being in the path of movement of said finger-like projection carried by said apparatus, said pivotal means being locked in said closed position when said finger-like projection contacts said engagement means whereby a portion of said sheet materials may be drawn against and severed by said longitudinal edge, said finger-like projection being releasable from said engagement means by pivotal movement of said second pivotal means.

9. In a photographic apparatus wherein photographic sheet materials are processed, said apparatus having a passage formed therein from which portions of said sheet materials may be drawn, the combination with said apparatus of pivotal means comprising a transverse member including a longitudinal edge for severing portions of said sheet materials, said pivotal means being mounted on said apparatus adjacent said passage for movement between a closed position wherein said member covers said passage and an open position wherein said member is to one side of said passage, latching means attached to said pivotal means, said latching means including at least one finger-like projection extending toward said apparatus, at least one engagement means being in the path of movement of said finger-like projection carried by said apparatus, said pivotal means being locked in said closed position when said finger-like projection contacts said engagement means whereby a portion of said sheet materials may be drawn against and severed by said longitudinal edge.

References Cited in the file of this patent
UNITED STATES PATENTS
2,869,444    Wareham _____ Jan. 20, 1959